United States Patent [19]

Wyatt

[11] Patent Number: 4,646,464

[45] Date of Patent: Mar. 3, 1987

[54] CRAWFISH HARNESS

[76] Inventor: Dennis D. Wyatt, 215 Nichols, Fulton, Mo. 65251

[21] Appl. No.: 769,405

[22] Filed: Aug. 26, 1985

[51] Int. Cl.⁴ .......................................... A01K 83/06
[52] U.S. Cl. ..................................... 43/44.4; 43/44.8
[58] Field of Search ................ 43/44.4, 44.2, 44.8, 43/44.6

[56] References Cited

U.S. PATENT DOCUMENTS

| | | | |
|---|---|---|---|
| 788,296 | 4/1905 | West | 43/44.4 |
| 1,993,582 | 3/1935 | Anderson | 43/44.4 |
| 2,143,054 | 1/1939 | Copeland | 43/44.4 |
| 2,192,800 | 3/1940 | Peterson | 43/44.4 |
| 2,463,369 | 3/1949 | Finlay et al. | 43/44.4 |
| 2,598,011 | 5/1952 | Pitre | 43/44.4 |
| 3,398,477 | 8/1968 | Paluzzi | 43/44.4 |

FOREIGN PATENT DOCUMENTS 930163  7/1973  Canada ................................. 43/44.4

*Primary Examiner*—Nicholas P. Godici
*Assistant Examiner*—Karen Skillman
*Attorney, Agent, or Firm*—Kokjer, Kircher, Bradley, Wharton, Bowman & Johnson

[57] ABSTRACT

A harness which secures a crawfish on a fishhook for use as bait. A harness body is formed by a wire bent to form an eye at one end and a notch at the opposite end. Offset portions of the wire overlap one another to form an opening for receiving the shank of the fishhook. An elastic cord extends through the eye of the harness body. Rigid collars crimped on the ends of the cord are larger than the eye or notch. The harness is used by hooking the fishhook through the tail of the crawfish with the harness body against its abdomen to hold the fishhook shank against the crawfish body. The cord is stretched around the crawfish body and one end is inserted in the notch with the cord under tension to secure the harness on the body of the crawfish behind its legs to permit the crawfish to move naturally for attraction of fish.

7 Claims, 7 Drawing Figures

CRAWFISH HARNESS

BACKGROUND AND SUMMARY OF THE INVENTION

This invention relates generally to fishing gear and more particularly to a harness arrangement for securing a crawfish on a fishhook to serve as bait.

Although it has long been known that fresh water fish feed on crawfish (sometimes known as "crawdads"), the use of crawfish as fishing bait has been inhibited by the difficulty that is involved in securing the crawfish on a fishhook. If the fishhook is simply hooked through the crawfish, the bait can easily slip off of the hook. If the crawfish is hoked through the mouth ares, natural movement of the bait is prevented, and this significantly detracts from its ability to attract fish.

Accordingly, it is evident that a need exists for a device to securely and effectively attach a crawfish to a fishhook so that the crawfish can be used as fishing bait. It is the primary goal of the present invention to meet that need.

More specifically, it is an object of the invention to provide a harness device which acts in conjunction with a conventional fishhook to secure crawfish on the fishhook for use as bait.

Another object of the invention is to provide a harness device which securely maintains the crawfish in placce on the fishhook and yet permits the crawfish to move naturally. In this regard, it is an important feature of the invention that the harness device is constructed so that it can be attached to the body of the crawfish behind the legs so that the legs and pincer arms are unobstructed and can be used in the normal way by the crawfish. Consequently, the bait is able to move naturally and is effective in attracting fish. At the same, the fishhook is hooked through the tail of the bait where it is able to effectively hook fish that take the bait.

A further object of the invention is to provide a harness device of the character described which can be quickly and easily attached to the bait and yet securely maintains the bait on the fishhook. An elastic cord attaches the wire body of the harness to the body of the crawfish and is applied by stretching it around the crawfish and engaging one end of the cord in a notch formed on one end of the harness body. The ends of the cord are provided with rigid collars which act against the harness body to maintain the cord under tension so that it remains firmly in place on the crawfish.

An additional object of the invention is to provide a harness device of the character described which cooperates with the fishhook to maintain the bait in optimum position relative to the hook end of the fishhook. The wire harness body is constructed to receive and grip against the shank of the fishhook such that the shank extends along the body of the crawfish with the barbed end of the fishhook hooked through its tail. This keeps the crawfish securely in place at the proper position on the fishook without unduly restricting movement of the legs, arms or head of the crawfish.

Yet another object of the invention is to provide a harness device of the character described which is suitable for use with crawfish that very widely in size. The elastic nature of the cord permits the harness to be applied to and securely retained on crawfish of various sizes, and the versatility of the device is enhanced accordingly.

A still further object of the invention is to provide a harness device of the character described which is simple and economical to construct and light in weight. The wire construction of the harness body gives it a light weight and a low manufacturing cost because the wire itself is inexpensive and can be easily bent into the necessary shape without the need for expensive equipment.

Other and further objects of the invention, together with the features of novelty appurtenant thereto, will appear in the course of the following description.

BRIEF DESCRIPTION OF THE DRAWING

In the accompanying drawing which forms a part of the specification and is to be read in conjunction therewith and in which like reference numerals are used to indicate like parts in the various views.

DETAILED DESCRIPTION OF THE INVENTION

Figure 1:
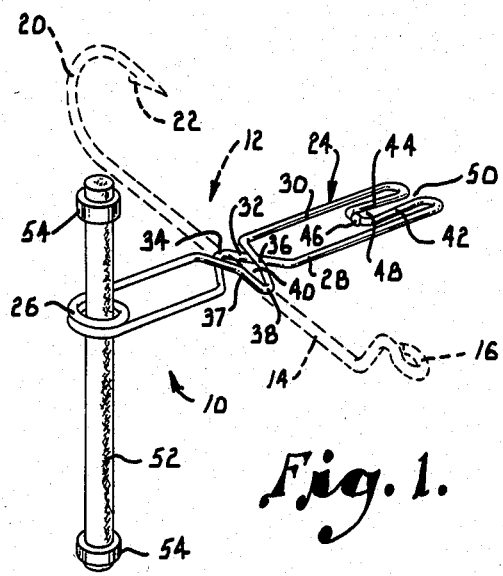
FIG. 1 is a perspective view of a crawfish harness device constructed according to a preferred embodiment of the present invention, with the harness applied to a fishhook shown in phantom.
Figure 2:
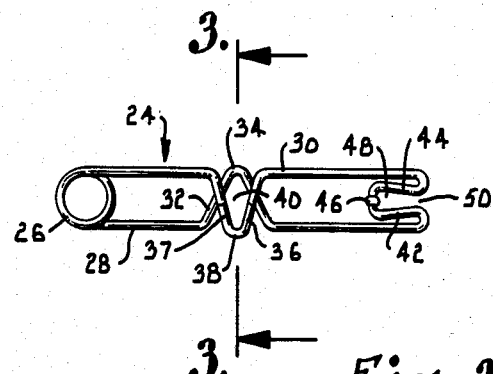
FIG. 2 is a plan view of the harness device shown in FIG. 1.
Figure 3:
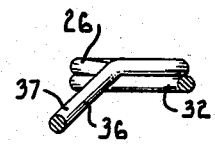
FIG. 3 is a fragmentary sectional view on an enlarged scale taken generally along line 3—3 of FIG. 2 in the direction of the arrows.

Referring now to the drawing in more detail, numeral 10 generally designates a harness device which is used to secure a crawfish to a conventional fishhook 12 so that the crawfish can be used as fishing bait. The fishhook 12 has a straight shank 14 with an eye 16 on one end for attachment to a fishing line 18 (see FIG. 7). A hook 20 is formed on the opposite end of shank 14 and terminates in a barb 22.

The harness device 10 has a harness body 24 formed by a metal wire which is bent into the configuration shown in the drawings. At one end of the harness body 24, the wire is bent to form a circular eye 26. The wire extends from opposite sides of the eye 26 to form opposite sides 28 and 30 of the harness body which ae straight for the majority of their lengths. Near its center, side 28 is bent toward the opposite side 30 to form a V-shaped offset 32 having its tip or apex 34 located generally in line with the straight portion of side 30. Midway along the length of side 30, the wire is bent to form another V-shaped offset 35 which overlaps offset 32. Offset 36 is bent downwardly somewhat at 37 so that its tip or apex 38 is located slightly below the tip 34 of the other offset 32. The overlapping offsets 32 and 36 cooperate to form an opening 40 in the center of the harness body which is large enough to receive the shank 14 of the fishhook.

The opposite sides 28 and 30 of the wire harness body 24 are bent back on themselves at the end of the harness body opposite the eye 26. The legs 42 and 44 which are bent back to extend along the sides 28 and 30 are bent again at their end portions to extend toward one another and are soldered or welded end to end at 46. Between legs 42 and 44, a U-shaped notch 48 is presented adjacent the end of the harness body 24. The notch 48 has a throat 50 which is somewhat narrower than the remainder of the notch.

The harness device 10 also includes a flexible elastic cord 52 which is best shown in FIG. 1. Cord 52 is smaller in diameter than the eye 26 and extends freely through the eye. The diameter of the cord is approximately equal to the maximum width of notch 48 between legs 42 and 44. The throat 50 of the notch is smaller than the diameter of cord 52 so that the cord must be compressed somewhat in order to pass through the throat 50 and into notch 48.

A rigid metal collar 54 is crimped or otherwise secured on each end of cord 52. The collars 54 are larger than cord 52, and each collar has a diameter somewhat greater than the diameter of eye 26. The diameter of each collar 54 is also greater than the width of notch 48 between the legs 42 and 44.

In use, the harness device 10 cooperates with the fishhook 12 to permit use of a crawfish 56 as fishing bait. The crawfish 56 has a main body 58 from which four pairs of legs 60 extend, along with a pair of pincer arms 62. A tail 64 extends behind the main body 58 of the crawfish.

Figure 5:
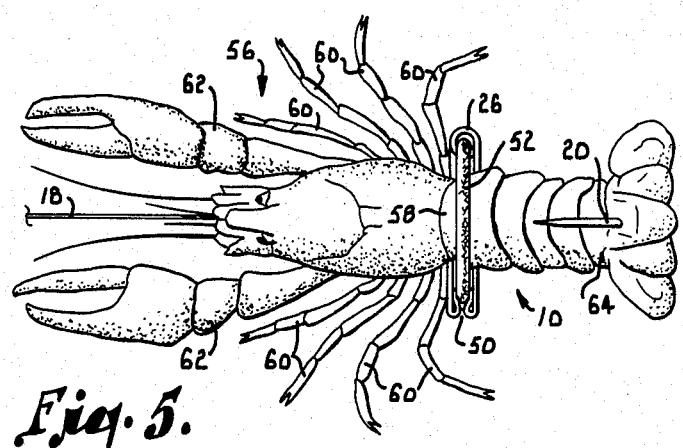
FIG. 5 is a top plan view showing the harness device applied to a crawfish used as fishing bait.
Figure 6:
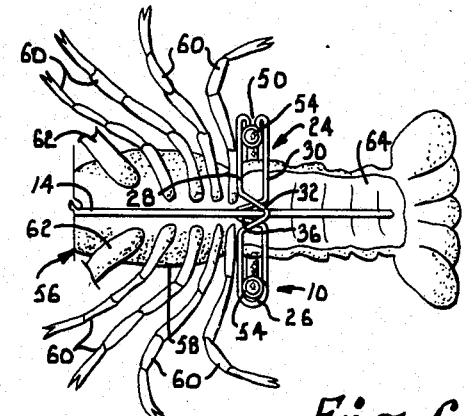
FIG. 6 is a bottom plan view showing the harness device applied to a crawfish, with the crawfish shown only fragmentarily.
Figure 7:
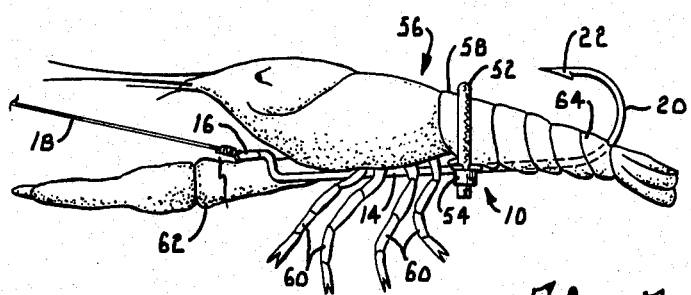
FIG. 7 is a side elevational view showing the harness device applied to a crawfish.

The harness device 10 is used by inserting the fishhook 12 through opening 40 in the harness body 24. With the shank 14 extending through opening 40, the barb 22 is passed upwardly through the tail 64 of the crawfish so that the hook 20 is hooked through the tail as shown in FIGS. 5-7. The harness body 24 is situated against the abdomen of the crawfish at a location immediately behind the rearmost pair of legs 60. The elastic cord 52 is then drawn tightly around and over the back of the crawfish, and one end of the cord is inserted through throat 50 and into notch 48. Stretching of cord 52 places it under tension as it is drawn around the crawfish body, and collar 54 is larger than notch 48 to avoid passing through the notch. The tension of the cord holds one collar 54 against the eye 26 and the other collar 54 against the legs 42 and 44 on opposite sides of notch 48.

Figure 4:
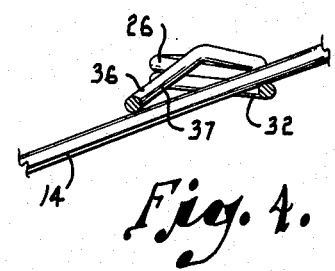
FIG. 4 is a fragmentary sectional view similar to FIG. 3, but showing the harness body applied to the shank of a fishhook.

In this manner, the harness device 10 is applied to the crawfish body, with the tension in the elastic cord 52 holding the harness body 24 in place against the abdomen of the crawfish, as best shown in FIG. 6. The shank 14 of the fishhook extends through opening 40 and is gripped on the top and bottom by the V-shaped offset portions 36 and 32, as shown in FIG. 4. This holds the shank 14 in extension long the underside of the crawfish body with eye 16 located immediately beneath its head, as shown in FIG. 7.

The fishing line 18 extends generally forwardly from the crawfish and the harness device 10 is engaged around the crawfish body behind the legs 60 so that the legs 60, arms 62 and head of the crawfish can be manipulated normally and naturally. The crawfish is thus able to move naturally so that its ability to attract fish is not adversely affected by the harness device.

The tension of cord 52 and the engagement of collars 54 with the eye 26 and notch 48 securely retains the harness device in place on the crawfish 56. Due to the narrow width of throat 50, the cord is unable to easily slip out of notch 48 even if the tension in cord 52 is relaxed somewhat. The harness device retains the shank 14 of the fishhook in extension along the underside of the crawfish body and is thereby effective in preventing the fishhook from slipping off of the tail 64. Consequently, the crawfish is securely held on the end of the fishing line by the harness device and fishhook with the hook 20 located such that it hooks a fish that takes the bait. The harness can easily be removed by slipping the end of cord 52 out of notch 48 through the throat 50 to detach the end of the cord from the harness body 24.

The harness device 10 can be modified without departing from the scope of the present invention. For example, one end of cord 52 can be looped through or tied to the end of the harness body which carries the eye 26. Likewise, the opposite end of cord 52 can be provided with a suitable hook (not shown) which can be detachably hooked to an eye or other structure formed on the opposite end of the harness body 24 in place of the notch 48.

It is also contemplated that the harness body may be constructed such that the tips 34 and 38 of the V-shaped offsets are ordinarily adjacent to or point toward one another. The opposite sides 28 and 30 can be squeezed toward one another to cause the offsets 32 and 36 to overlap to provide the opening 40 through which the fishhook can then be extended. When the sides are released, they spring away from one another, and the fishhook shank is thereafter firmly gripped by the offset portions 32 and 36 due to the resulting spring action. This arrangement holds the harness body 24 more firmly to the fishhook shank 14 and may be preferred in some cases.

Cord 52 is preferably short enough to require it to be stretched in order to extend over the back of the crawfish with the opposite ends of the cord coupled at eye 26 and notch 48 to the opposite ends of the harness body 24. Stretching of the cord in this manner places it under tension so that the harness device is securely held in place on the body of the crawfish. Although the crawfish vary in size, the cord can be short enough that it can be stretched around relatively large crawfish and yet is placed under at least some degree of tension when applied to relatively small crawfish.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A harness arrangement for securing a crawfish on a fishhook, comprising:
   a harness body having opposite end portions;
   said harness body including a wire bent in a configuration to present an eye at said one end portion and a notch at said opposite end portion;
   a flexible cord for attaching said harness body to the crawfish, said cord having one end coupled with one end portion of said harness body and an opposite end adapted to be detachably coupled with the opposite end portion of said harness body to maintain the cord in a tense condition drawn around the body of the crawfish to secure said harness body thereto;

said cord extending through said eye and including enlargements on said opposite ends thereof which are larger than said eye and said notch to prevent said opposite ends of the cord from passing through the eye or notch;

said cord being fitted into and out of said notch with the enlargement on said opposite end of the cord preventing said cord from slipping out of the notch when the cord is stretched in a tense condition;

means for coupling the fishhook with said harness body at a preselected location thereon to permit the fishhook to be hooked to the crawfish at a location offset from said preselected location;

said coupling means further comprising a first offset portion bent from one side of said wire; and a second offset portion bent from the other side of said wire and overlapping with the first offset portion to present an opening through said offset portions, said opening being adapted to receive the fishhook with said offset portions gripping against the fishhook.

2. The invention of claim 1, wherein each offset portion has a substantially V-shaped configuration.

3. A harness device for securing a crawfish on a fishhook having a shank and a barb, said device comprising:

a harness body having opposite end portions;

a flexible elastic cord having opposite ends and a length to be stretched around the body of the crawfish in a tense condition with the opposite ends of the cord adjacent the opposite end portions of said harness body;

means for coupling one end of said cord with one end portion of said harness body;

said coupling means for said one end of the cord further comprising an eye on said one end portion of the harness body, said cord extending through said eye;

an enlargement on said one end of the cord larger than said eye to avoid passing therethrough when pulled against the eye;

means for detachably coupling the opposite end of said cord with the opposite end portion of said harness body to maintain the cord tightly stretched around the crawfish body for securing the harness body thereto;

said detachable coupling means further comprising a notch on said opposite end portion of the harness body, said cord having a size to be fitted into and out of said notch;

an enlargement on said opposite end of the cord larger than said notch to avoid being pulled therethrough;

said harness body comprises a wire having opposite sides, said wire being bent to present said eye and said notch thereon;

said gripping means comprises offset portions of said wire bent from the opposite sides thereof and overlapping one another to present an opening for receiving the shank of the fishhook with said offset portions gripping the shank; and gripping means on said harness body between said opposite end portions thereof for gripping the shank of the fishhook to secure same to the crawfish and permit the barb to be hooked to the crawfish at a location offset from said gripping means.

4. A harness device for securing a crawfish on a fishhook having a shank and a barb, said device comprising:

a wire bent in a manner to present an eye and a notch spaced apart from said eye;

a flexible elastic cord extending through said eye and having a size to be fitted into and out of said notch, said cord having enlarged opposite ends which are larger than said eye and notch to permit the cord to be stretched around the body of the crawfish in a tense condition with one enlarged end engaging said eye and the other enlarged end engaging said notch to maintain the cord stretched tightly around the crawfish body; and a pair of overlapping offset portions and said wire located between said eye and notch and cooperating to present an opening for receiving the shank of the fishhook with said offset portions gripping against the shank to maintain same against the crawfish and permitting the barb to be hooked to the crawfish.

5. A device as set forth in claim 4, wherein said notch has a throat smaller than said cord to require the cord to compress as same is being fitted into and out of the notch.

6. A device as set forth in claim 4, wherein: said wire has opposite sides; and said offset portions extend from the opposite sides of said wire and each has a generally V-shaped configuration.

7. A device as set forth in claim 4, including a rigid collar secured on each end of said cord, said collars providing said enlarged opposite ends of the cord.

* * * * *